United States Patent [19]

Beckman et al.

[11] 4,445,395

[45] May 1, 1984

[54] APPARATUS FOR MEASUREMENT OF ICE MOVEMENT

[75] Inventors: Wayne C. Beckman; Patrick E. Harwell, both of Santa Barbara, Calif.

[73] Assignee: Global Marine Inc., Los Angeles, Calif.

[21] Appl. No.: 316,769

[22] Filed: Oct. 30, 1981

[51] Int. Cl.$^3$ ............................................. F16C 1/10
[52] U.S. Cl. ............................................. 74/501 R
[58] Field of Search ..................... 74/501 R, 501 P; 464/52

[56] References Cited

U.S. PATENT DOCUMENTS

| | | | |
|---|---|---|---|
| 1,718,978 | 7/1929 | Protzeller | 74/501 |
| 2,218,903 | 10/1940 | Bratz | 74/501 |
| 2,858,708 | 11/1958 | Brickman | 74/501 |
| 3,205,727 | 9/1965 | Sevrence | 74/501 |
| 3,922,882 | 12/1975 | Kimata | 74/501 |

Primary Examiner—Kenneth Dorner
Attorney, Agent, or Firm—Christie, Parker & Hale

[57] ABSTRACT

There is provided an apparatus for measuring linear movement of an ice mass on a body of water. The apparatus comprises two stationary anchors on the floor of the body of water. Two sheathed cables attached to the anchors extend from the anchors through a downtube in the ice mass to spring-loaded reels located above the ice mass. The spring-loaded reels are coupled to multi-turn potentiometers. The downtube comprises a pipe and two cable guide structures disposed therein. The guide structures are oil filled to afford smooth axial movement of the cables through the downtube as the ice mass and the downtube carried thereby move relative to the anchors.

4 Claims, 5 Drawing Figures

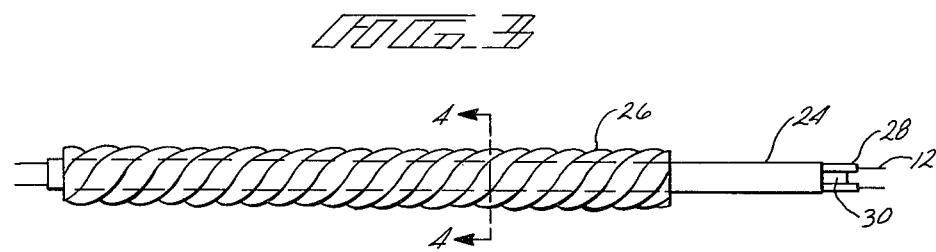
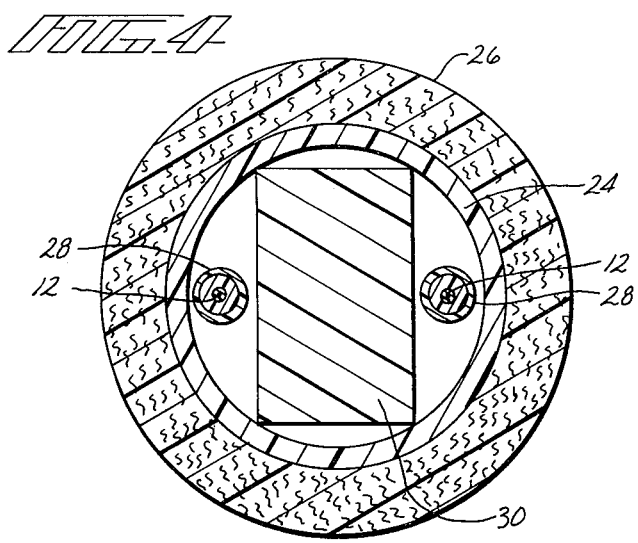
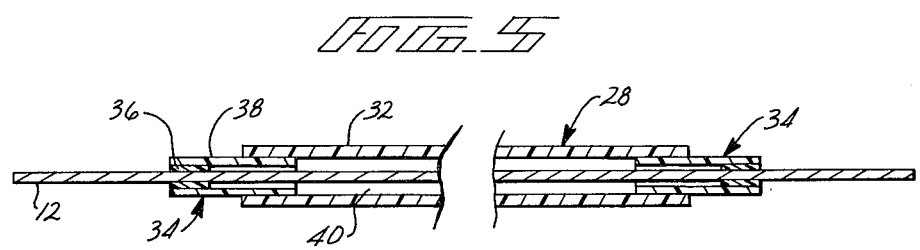

4,445,395

APPARATUS FOR MEASUREMENT OF ICE MOVEMENT

BACKGROUND OF THE INVENTION

Ice movement is one of the most important environmental parameters considered in off-shore arctic platform and island design. Ice movement data, preferably collected over several years, is first required to determine the risk of ice movement in a given area. In limited ice movement areas, where a non-ice movement resistant structure can be used to drill the well, long-term ice movement data is then useful to design safe, cost-effective ice movement contingency systems. Data on ice movement magnitude and direction may be needed to determine the number of ice defense slots around a structure, or the size of an ice-free moat. Rate information is needed to formulate a safe maintenance program in the event the surrounding ice sheet does move toward the platform.

In areas where appreciable ice movement is known to occur, ice movement data are required to determine design ice loads. Ice movement rates are important as the ice failure strength is highly dependent on the ice strain rate. Ice movement magnitude data are needed to assess the risk of ice ride-up on the structure's working surface, or pile-up against the structure. After such pile-ups of rubble pile, freeze and consolidate, the structure's effective diameter against the moving ice sheet is increased, thereby increasing the ice loads caused by subsequent ice movement.

Typically, ice movement in ocean waters of 100 foot depth or less has been measured by length/azimuth systems. These systems detect ice movement electromechanically by measuring the distance and azimuth between a reference point on the ice and an anchor on the sea floor. A spring-loaded cable reel coupled to a multi-turn potentiometer provides a measure of the amount of cable stretched between the ice station and the reference anchor. The direction of the ice station relative to the anchor is sensed by a directional vane coupled to the distance-measuring cable below the ice mass. A continuous potentiometer coupled to the directional vane by means of an azimuth tube provides an electrical signal that is a measure of the relevant direction.

The distance-measuring cable is connected to the anchor on the ocean floor by passing it through the ice. The traditional method for allowing movement of the cable and azimuth tube through the ice is to pass the cable and azimuth tube through a larger guide tube filled with gelled material so that the cable is afforded axial movement and the azimuth tube is afforded axial rotation through the guide tube. The gel-filled guide tube is not sealed; the gel itself is relied upon to serve as a seal against entry of water into the guide tube. The guide tube extends through the ice and is typically fixedly attached thereto.

Problems with this arrangement have arisen due to the introduction of water into the guide tube from tidal action. Freezing of the water prevents the turning of the azimuth tube. The gelled material itself presents additional problems in that the gel comprises a diesel oil base which is environmentally objectionable. Additionally, handling of the gel in the field presented safety hazards.

Accordingly, it has remained desirable to develop an apparatus to measure ice movement which is not subject to inaccuracies caused by water freezing, which is environmentally acceptable and which is safe to handle. The solution to these problems is the subject of this invention.

SUMMARY OF THE INVENTION

According to the present invention, there is provided an apparatus for measuring linear movement of an ice mass on an ocean or other body of water. The apparatus comprises two reference anchors situated at predetermined locations on the ocean floor. To each anchor is attached a wire cable which extends through the ice mass which forms a barrier and is wound around a separate spring-loaded reel situated above the ice mass. Both wire cables pass through the ice mass and contact the spring-loaded reels at a single location. The apparatus includes a means for allowing the wire cable lengthwise movement through the ice mass. The spring-loaded reels are each coupled to a multi-turn potentiometer and provide a measure of the amount of cable stretched between the reel and reference anchor.

More particularly, the means for providing lengthwise movement of the cable through the ice mass comprises a downtube wherein a pair of guide structures are disposed within a pipe. The pipe is of rigid construction and provides protection for the guide structures. The length of the pipe is at least the thickness of the ice mass.

The guide structures are disposed in the pipe at diametrically opposed locations along the pipe. A deformable cushion separates the guide structures and restricts movement of the guide structures within the pipe. The deformable cushion also protects the guide structures from damage by absorbing the compression forces from water freezing within the tube.

The cables, preferably having a smooth elastomeric sheath, are disposed within the guide structures and are afforded lengthwise movement through the ice mass. Each guide structure comprises a guide tube having an inner diameter greater than the outer diameter of the wire cable sheath and a length at least about the length of the pipe, the length of which is not arbitrary. The tube has a seal at each end which intimately and slidably cooperates with the outer surface of the sheathed cable. The tube is filled with a lubricant compatible with the sheath material, the tube, and the seals. The lubricant enables the sheathed cable to move lengthwise through the seals. The lubricant has a freezing point sufficiently low to assure that it will not solidify in an Arctic winter environment.

The seals carried at each end of the guide tube are comprised of an inner cylindrical component having an inside diameter substantially equal to the outer diameter of the sheathed cable. The inner component is inserted into and secured to an outer cylindrical component, which has an inside diameter substantially equal to the outer diameter of the inner component. The outer component is inserted into and secured to the guide tube which has an inside diameter substantially equal to the outside diameter of the outer component. All components are secured by conventional means, such as glues or solvents. Thus formed the seals prevent leakage of the lubricant to the environment, and leakage of water into the guide structure.

A braided nylon rope is wrapped around the cylindrical exterior of the downtube for a length at least equal to the thickness of the ice mass. The rope provides some protection against damage from compression by the surrounding ice mass, but principally provides means facilitating extraction of the downtube from the ice mass by unwinding the rope from between the downtube and the adjacent ice mass.

BRIEF DESCRIPTION OF THE DRAWINGS

The above-mentioned and other features and advantages of the present invention will be better understood by reference to the following detailed description of a presently preferred embodiment of the invention, which description is presented with reference to the accompanying drawings, wherein:

FIG. 1 shows the relationship between the submerged anchors and the measurement station instrument box;

FIG. 3 is a side view of the downtube.

FIG. 4 is an enlarged cross-section view of the downtube taken along line 4—4 in FIG. 3; and FIG. 5 is a fragmentary longitudinal cross-section view of a guide structure present in the downtube.

DETAILED DESCRIPTION

The present invention provides an ice movement measurement apparatus 8 for the measurement of linear movement of an ice mass on an ocean or other body of water. The apparatus utilizes range-range trilateration by measuring the distances between a reference point on the ice and two anchors on the ocean floor. When the apparatus is first installed the relative locations of the reference point and the anchors are determined with precision; later changes and rates of change of these relative positions are determined to provide data which describe the direction and rate of movement of the ice mass at the reference point.

Figure 1:
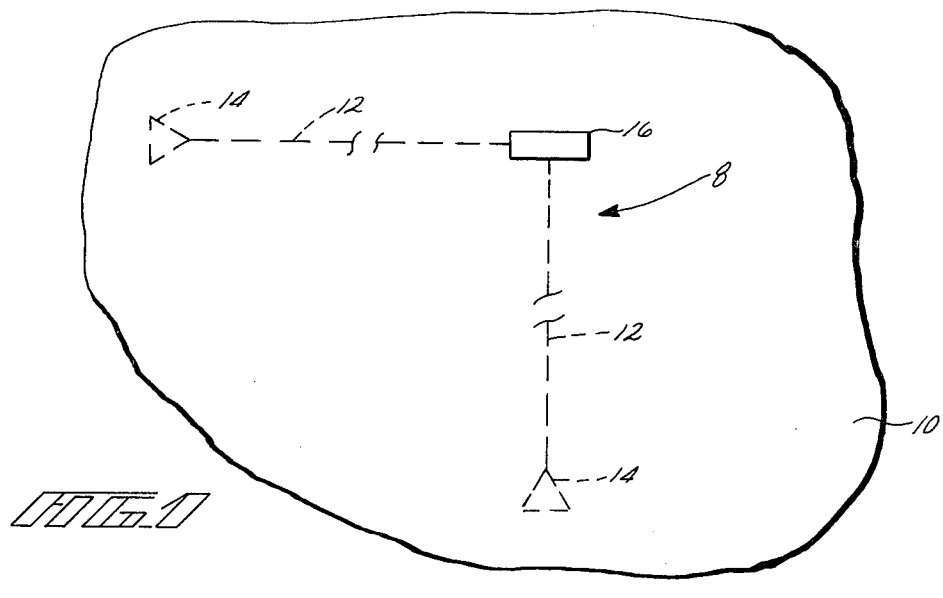
FIG. 1 is a top plan view of a portion of an ice sheet carrying an ice movement measurement installation according to this invention.

FIG. 1 shows apparatus 8 in operation on an ice mass 10 as seen from above the ice mass. Cables 12 extend from anchors 14 located initially at right angles from each other on the ocean floor to a reference point defined by an ice movement station box 16 above the ice mass wherein the position of the reference point relative to the anchors is determined electro-mechanically.

The absolute accuracy of this dual-wireline system is a function of the distance between the two anchors (which is the baseline length) and the distance between the anchors and the measurement station, i.e., the reference point on the ice mass. In a preferred use of the apparatus, the anchors are offset from the station a distance equal to or greater than the water depth at the site. This reduces the amount of vertical tidal movement measured by the apparatus. Typically the cable lengths are measured to an accuracy within about 0.1 feet, which, for example, translates to within about 0.3 feet in position accuracy at 150 feet range with a 30 foot baseline length.

Figure 2:
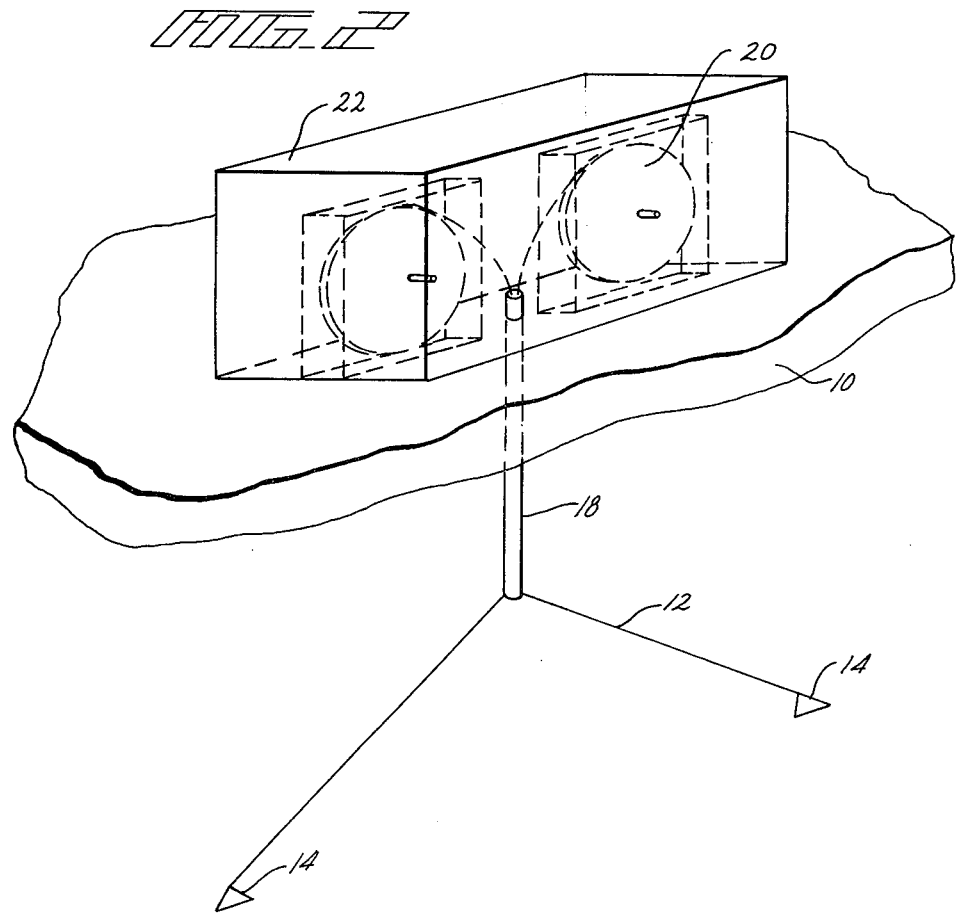
FIG. 2 is a simplified perspective view of the measurement installation shown in FIG. 1.

FIG. 2 is a simplified perspective view of apparatus 8 in place on the ice mass 10. The apparatus comprises two anchors 14 at predetermined locations on the ocean floor. To each anchor is attached a wire cable 12 which preferably is a sheathed wire cable. A particularly preferred cable comprises a nylon sheath around a multistrand wire line, the cable having an overall diameter of 1/16 inch. The cables pass through a downtube 18 which forms a passageway through the ice mass, and the cables are each wound around respective separate spring-loaded multi-turn reels 20 located in the station box 16.

In a preferred embodiment, the spring-loaded reels, wound with the cable, have an initial extension capacity of about 200 feet and are each coupled to a multi-turn potentiometer. As ice movement occurs, the distance between the spring-loaded reels and one or both of the anchors changes, resulting in the rotation of one or both of the spring-loaded reels. The movement of a reel is translated into an increase or decrease in electrical resistance measured by the corresponding multi-turn potentiometer and recorded by a conventional recorder at predetermined time intervals. The records can then be used to calculate ice movement direction and rate.

FIGS. 3 and 4 show the construction of the downtube 18. The downtube comprises a rigid pipe 24 and two guide structures 28 disposed within the pipe and separated by a deformable cushion 30. The functions of the pipe include protection of the guide structures from compressive stresses exerted by the ice mass and a means for restricting the movement of the guide structures. The presently preferred pipe is made of polyvinyl chloride. The guide structures extend at least the length of the pipe and preferably from the bottom end of the pipe to above the upper end of the pipe.

The length of the guide structures 28 is correlated to the length of downtube 18 which is correlated to the estimated maximum thickness of ice mass 10 during the period of use of apparatus 8. The downtube length is defined so that its upper and lower ends can be above and below the maximum thickness ice mass, with the lower end being a predetermined distance below the normal water surface. The lengths of the guide structures are determined so that when the structures are positioned with their lower ends closely adjacent the lower end of the downtube, the height of the oil columns in the guide structures produces an oil hydrostatic pressure at the lower ends of the guide structures which equals or slightly exceeds the hydrostatic pressure of seawater at the same depth. In this way, entry of seawater into the guide structures with movement of cables 12 is prevented.

The deformable cushion generally extends the length of the downtube and provides three functions. First, it provides a means for absorbing the compression that water exerts if it freezes within the downtube, thereby protecting the guide structures from damage. Secondly, it restricts the movement of the guide structures within the downtube. Thirdly, it functions as a thermal insulator to inhibit the growth of ice down the downtube. In the illustrated preferred embodiment, styrofoam is used to define cushion 30.

Movement of the guide structures within the downtube can be further restricted by securing the guide tubes to the pipe, typically to opposite sides of the inner circumference of the pipe. A preferred means for securing a guide structure to the pipe comprises drilling a pair of holes at each end of the pipe and passing wire or a molded plastic fastener from outside of the pipe through one of the holes, around the guide structure, and out the other hole and there connecting the two ends of the wire or plastic fastener so as to hold the guide structure tightly against the inner wall of the pipe.

The guide structures provide a means for affording lengthwise movement of the sheathed cables through the downtube. FIG. 5 is a longitudinal cross-section of a guide structure 28 with a sheathed cable 12 disposed through the guide structure. The guide structure comprises an elastomeric guide tube 32 having an inside diameter greater than the outside diameter of the sheath of the sheathed cable. The guide tube has a seal 34 at each end for intimately and slidably cooperating with the sheathed cable.

The guide tube is substantially filled with lubricant 40 for reducing friction between the seals and the sheathed cable. The lubricant is compatible with the sheath material, the guide tube and the seal. It is also resistant to freezing at temperatures typically encountered in locations where ice masses are measured, e.g., arctic regions. A preferred lubricant comprises a silicone oil base. The presently preferred lubricant is Dow Corning 200 which is a silicone oil having a kinematic viscosity of 1000 centistokes.

The seal has two components, an inner cylindrical component 36 and an outer cylindrical component 38. The inner component has an inside diameter substantially equal to the outside diameter of the sheathed cable and is inserted in and secured to outer component 38. Outer component 38 has an inside diameter substantially equal to the outside diameter of the inner component 36. The outer component further has an outer diameter substantially equal to the inside diameter of guide tube 32 and is inserted into and secured to the guide tube, thereby providing seals at both ends of the guide structure which are substantially oil-proof. The seals prevent the leakage to the environment of lubricant 40 contained within the guide structure and further prevent the leakage of water into the guide structure.

In the illustrated preferred embodiment, inner seal component 36 is made of silicone rubber and outer seal component 38 and guide tube 32 are made of polyurethane tubing with all components being secured together with cyano-acrylate glue.

It is preferred that a rope, preferably a braided nylon rope, is helically wound around the exterior circumference of the pipe of the downtube. The rope provides a casing for the pipe for a length equal to at least the thickness of the ice mass. The rope serves as a somewhat deformable cushion between the ice mass and the downtube, thereby absorbing at least a portion of the compressive stresses exerted by the ice mass on the downtube. The rope also facilitates the extraction of the downtube from the ice mass.

The downtube is typically inserted into a hole that has been drilled through the ice mass. The hole has a diameter sufficient to enable the downtube, as wrapped by the rope, to be fitted into it and to be held in place by contact with the inside wall of the hole. The downtube may be further secured to the ice mass by conventional means.

Ice forms intimately around the exterior of the downtube and rope, thereby peventing the extraction of the downtube from the ice mass. However, extraction of the downtube from the ice is simplified by unwinding the rope from the exterior of the downtube pipe. The ice that is formed around the rope is easily broken in small amounts as the rope is unwound. When the rope is unwound, there is a space between the downtube pipe and the wall of the hole in the ice mass and the downtube may then be extracted.

The preceding description has been presented with reference to the presently preferred embodiment of the invention shown in the accompanying drawings. Workers skilled in the art and technology to which this invention pertains will appreciate that alterations and changes in the described apparatus and structure can be practiced without meaningfully departing from the principles, spirit and scope of this invention. Accordingly, the foregoing description should not be read as pertaining only to the precise structures and procedures described, but rather should be read consistent with and as support for the following claims which are to have their fullest fair scope.

What is claimed is:

1. A guide structure for affording axial movement of a cable therethrough, the guide structure comprising a guide tube having an inner diameter greater than the outer diameter of the cable and a seal carried by each end of the tube for intimately and slidably cooperating with the outer surface of the cable disposable through the guide structure, each seal including an inner cylindrical component having an inside diameter substantially equal to the diameter of the cable, and the inner component being secured to an outer cylindrical component having an inner diameter substantially equal to the outer diameter of the inner component, and said outer component has an outer diameter substantially equal to the inner diameter of the guide tube and is secured therein to form a substantially oil-proof seal through which the cable can pass, and a quantity of lubricant compatible with the cable, the tube, and the seals disposed within the tube and substantially filling the same between the seals for lubricating the cable and the seals to thereby enable the cable to move lengthwise through the guide structure.

2. A guide structure as claimed in claim 1 wherein the inner cylindrical component of the seal is made of silicone rubber.

3. A guide structure as claimed in claim 1 wherein the outer cylindrical component of the seal is made of polyurethane.

4. A guide structure as claimed in claim 1 wherein the means for securing the inner component of the seal to the outer component of the seal and the other component of the seal to the guide tube comprises cyano-acrylate glue.

* * * * *

UNITED STATES PATENT AND TRADEMARK OFFICE
CERTIFICATE OF CORRECTION

PATENT NO. : 4,445,395

DATED : May 1, 1984

INVENTOR(S) : Wayne C. Beckman and Patrick E. Harwell

It is certified that error appears in the above-identified patent and that said Letters Patent is hereby corrected as shown below:

Column 6, line 52, for "other" read -- outer --.

Signed and Sealed this

Fifteenth Day of January 1985

[SEAL]

Attest:

*Attesting Officer*

GERALD J. MOSSINGHOFF

*Commissioner of Patents and Trademarks*